No. 685,343. Patented Oct. 29, 1901.
J. G. OGDEN.
REFRIGERATOR.
(Application filed Nov. 5, 1900.)
(No Model.) 2 Sheets—Sheet 1.

Witnesses:
Charles L. Herrick
E. V. Brandt

Inventor:
John G. Ogden
By Jesse & H. M. Cox
Attorneys.

No. 685,343.  
J. G. OGDEN.  
REFRIGERATOR.  
(Application filed Nov. 5, 1900.)
Patented Oct. 29, 1901.
(No Model.)
2 Sheets—Sheet 2.
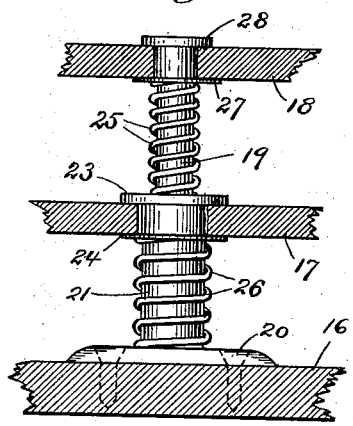
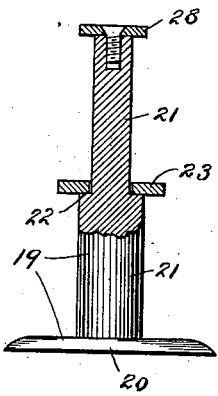
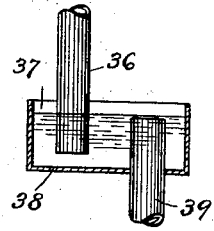
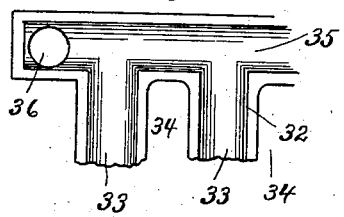
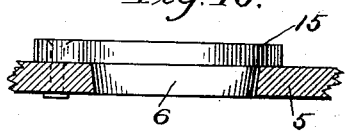
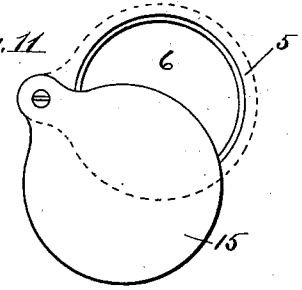
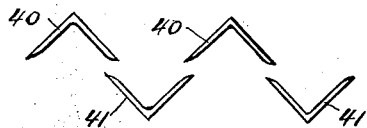
Witnesses:  
Charles L. Herrick  
E. T. Brandt
Inventor:  
John G. Ogden  
By Jesse & H. M. Cox  
Attorneys.
THE NORRIS PETERS CO., PHOTO-LITHO., WASHINGTON, D. C.

UNITED STATES PATENT OFFICE.

JOHN G. OGDEN, OF CHICAGO, ILLINOIS.

REFRIGERATOR.

SPECIFICATION forming part of Letters Patent No. 685,343, dated October 29, 1901.

Application filed November 5, 1900. Serial No. 35,483. (No model.)

*To all whom it may concern:*

Be it known that I, JOHN G. OGDEN, a citizen of the United States, residing in the city of Chicago, county of Cook, and State of Illinois, have invented a new and useful Improvement in Refrigerators, of which the following is a specification.

My invention relates to refrigerators for cooling and preserving food; and the objects of my invention are, first, to provide means for insulating the ice and food chambers, so as to prevent the access of heat thereto; second, to provide a compound door of such construction that the component parts thereof may be self-adjusting into their respective door-casings; third, to provide suitable means of ventilation; fourth, to provide means for regulating the amount of ventilation; fifth, to provide an ice-chamber and drain of such construction that the air may freely circulate between the ice and food chambers without permitting the water from the ice to enter the food-chamber, and, sixth, to provide a trap in the drain-pipe for permitting the escape of water without permitting the entrance of air. I accomplish these objects by the device shown in the accompanying drawings, in which—

Figure 1:
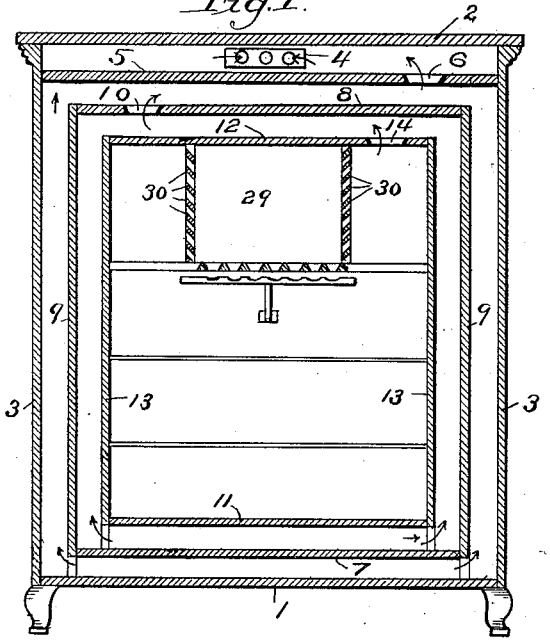
Figure 2:
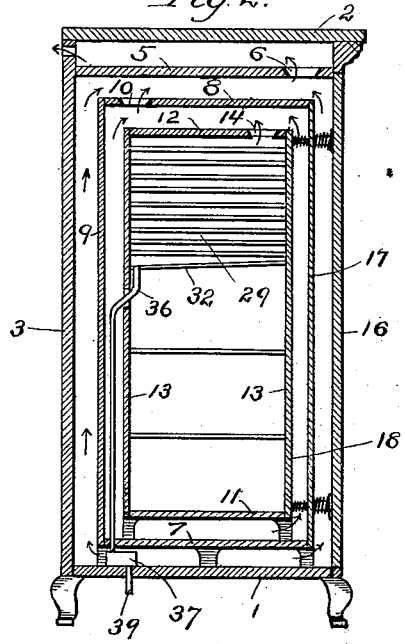
Figure 3:
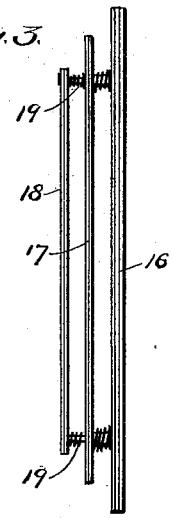
Figure 4:
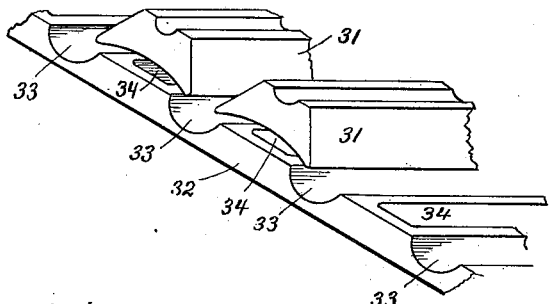
Figure 5:
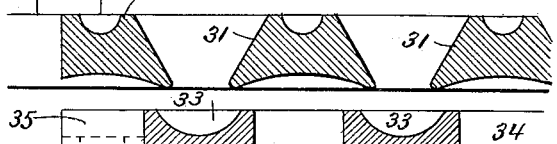

Figures 1 and 2 are vertical sectional views of the refrigerator, taken, respectively, in longitudinal and transverse directions. Fig. 3 is a view of the compound door, showing the vertical edge thereof. Fig. 4 is a perspective view showing a portion of the floor of the ice-chamber and the manner of carrying off the water therefrom. Fig. 5 is a view in vertical section taken transversely to the bars forming the floor of the ice-chamber and showing in detail the construction of said chamber. Fig. 6 is a detail view showing the construction of the door-bolts and position of the doors relatively thereto. Fig. 7 is a detail view, partly in section, also showing the construction of said door-bolts. Fig. 8 is a detail view showing a portion of the drain for carrying off the water from the ice-chamber. Fig. 9 shows the construction of the trap provided in the waste-pipe. Fig. 10 is a detail view, partly in vertical section, showing a ventilating-aperture and shutter. Fig. 11 is a top view of said ventilating-aperture and shutter, showing the latter in a partially-closed position. Fig. 12 is a detail view showing an alternative construction of the floor of the ice-chamber.

Similar figures of reference refer to similar parts throughout the several views.

The reference-figure 1 represents the bottom, 2 the top, and 3 3 the side walls, respectively, of the outer box or casing, which is substantially air-tight except at its upper portion, where it is provided with an air-outlet 4. A short distance below the said top 2 and extending substantially parallel thereto is the partition 5, which is provided with the ventilating-aperture 6.

The bottom 7, top 8, and side walls 9 9 constitute a second box or casing within said outer casing and below said partition 5, said second casing being also substantially air-tight except at the ventilating-aperture 10 in said top 8. Within said second casing is a third casing, which comprises the bottom 11, top 12, and side walls 13 13, said third casing also being substantially air-tight, but having in the top thereof the ventilating-aperture 14. The ventilating-apertures, located in the tops of the respective casings and in the partition 5, are provided with shutters. (Not shown except in Figs. 10 and 11.) In said partition 5 the aperture 6 is provided with a shutter 15, which is pivoted in such a manner that it may close over said aperture or may be swung aside, so as to leave any amount of opening desired.

The three casings above described are of such relative size and are so constructed that a continuous chamber or air zone is formed between the outer and second casing and also between the second and third casing, as shown in Figs. 1 and 2. The door of the refrigerator is of special construction and consists of the outer panel 16, which is hinged to a side wall of the outer casing, the second panel 17, and third panel 18. Said panels are located at distances apart corresponding to the distances between the respective casings and are adapted to complete said casings when the door is in a closed position. The said door-panels are held in their proper positions by means of the bolts 19 19. (Shown in detail in Figs. 6 and 7.) Said bolts are provided with heads 20, whereby they are rigidly secured to the outer door-panel 16. The shaft 21 of the bolt extends from said outer panel through the inner panel 18, the inner portion of said bolt-shaft between the panel 17 and panel 18 being of reduced cross-section, thereby forming a shoulder 22.

The washer 23 encircles the reduced portion of the bolt-shaft 19 and is limited in its travel thereon by the said shoulder 22. The second door-panel 17 is apertured so as to loosely receive the larger portion of the bolt-shaft 19, and said panel is held in position by means of said washer 23 and the washer 24, placed on opposite sides of said panel. Said washers 23 and 24 are held in position by means of the helical springs 25 and 26, respectively, which encircle said bolt-shaft, the opposite extremity of said spring 26 bearing against the bolt-head 20 and the opposite extremity of the spring 25 bearing against the washer 27 at the outer side of the inner panel 18. The washer 28 is secured to the extremity of the bolt-shaft 19 and retains said inner panel 18 upon said bolt. Said inner panel receives said bolt-shaft loosely, so that when sufficient pressure is exerted against said door-panel said panel will travel upon said bolt-shaft against the pressure of the spring 25. In a similar manner pressure exerted against the inner side of the panel 17 will cause said panel to move toward the bolt-head 20 against the spring 26. The inner panels are therefore movable upon the bolt-shaft 21 independently of each other and independently of the outer panel 16. By this construction when the outer panel is closed and comes to a bearing in its door-frame the panels 17 and 18 are caused to fit closely in their respective door-frames, the springs 25 and 26 permitting said panels to adjust themselves into position in said frames and firmly maintain such position by reason of the pressure of said springs. When the door is closed, the said panels complete the different boxes or casings of which the refrigerator is composed, thus leaving the inclosed air-passages continuous.

At the upper portion of the inner casing is the ice-chamber 29, the side walls of which are composed of the slats or bars 30, so constructed as to retain the ice within said chamber, but permit free circulation of air. The floor of the chamber is composed of the slats or bars 31. (Shown in detail in Figs. 4 and 5.) Beneath said bars 31 is the drain 32, which consists, preferably, of a metallic plate so constructed as to provide channels 33 immediately beneath the interstices between said bars 31 to catch the water from the ice-chamber 29. The apertures 34 occur in said drain between the said channels 33 therein, said apertures extending beneath the said slats or bars 31. This construction affords free circulation of air through the floor of the ice-chamber, but effectually prevents water from entering the lower portions of the refrigerator.

The drain 32 is inclined, so that the water tends to flow toward the cross-channel 35. (Best shown in Fig. 8.) From the lower end of said channel 35 the waste-pipe 36 leads downward to the trap 37. Said trap (shown in detail in Fig. 9) consists of a pan 38, from which leads the discharge-pipe 39. The pipe 36 terminates near the bottom of said pan, while the pipe 39 opens near the top thereof. When the water in said pan, therefore, is high enough to overflow into the discharge-pipe 39, the lower opening of the pipe 36 is below the surface of said water, and thereby sealed, so as to prevent hot air from entering the ice-chamber through the said pipe 36.

In refrigerators of great capacity for the purpose of special strength and simplicity of construction I prefer to construct the floor of the ice-chamber in the manner shown in Fig. 12. In this alternative construction the ice rests upon the angle-beams 40 40, so placed that their apices are above. Said beams 40 are parallel and at suitable distances apart, so that the inverted angle-beams 41 41 below said beams 40 constitute channels for carrying off the waste water. The lower row of beams 41 is placed far enough below the upper row of beams 40 to permit a free circulation of air, as in the construction heretofore described.

I do not limit myself to the number of boxes or casings and intervening zones or air-passages, as the number thereof may be varied to suit different conditions.

What I claim as new, and desire to secure by Letters Patent, is—

1. In a refrigerator, the combination of a series of boxes or casings, one within another, forming a series of insulating zones, a door consisting of a series of movable panels fitting into a corresponding series of door-frames in said boxes or casings, bolts for guiding said panels, and springs acting upon said panels for permitting the independent adjustment of the inner panels in their respective door-frames.

2. In a refrigerator a series of boxes or casings in the form of parallelepipeds of different sizes one within another, the corresponding faces of said boxes or casings being distant from each other, thereby forming insulating zones or passages which completely surround the next smaller box or casing, one of the outer of said boxes or casings having a hinged panel or door whereto are yieldingly attached other panels or doors fitting respectively into door-frames in the inner ones of said boxes or casings, said panels or doors being distant or separated from each other thereby preserving the continuity of the above-mentioned zones or passages.

JOHN G. OGDEN.

Witnesses:
ELI BRANDT,
ARTHUR M. COX.